Sept. 28, 1965 S. M. SLAWSKY 3,209,256
PEAK SIGNAL DETECTOR HAVING AUTOMATIC MEANS TO INDICATE
THE MAXIMUM AMPLITUDE AND ITS TIME OF OCCURRENCE
Filed Sept. 25, 1962 2 Sheets-Sheet 1

INVENTOR.
STANLEY M. SLAWSKY

BY
ATTORNEY

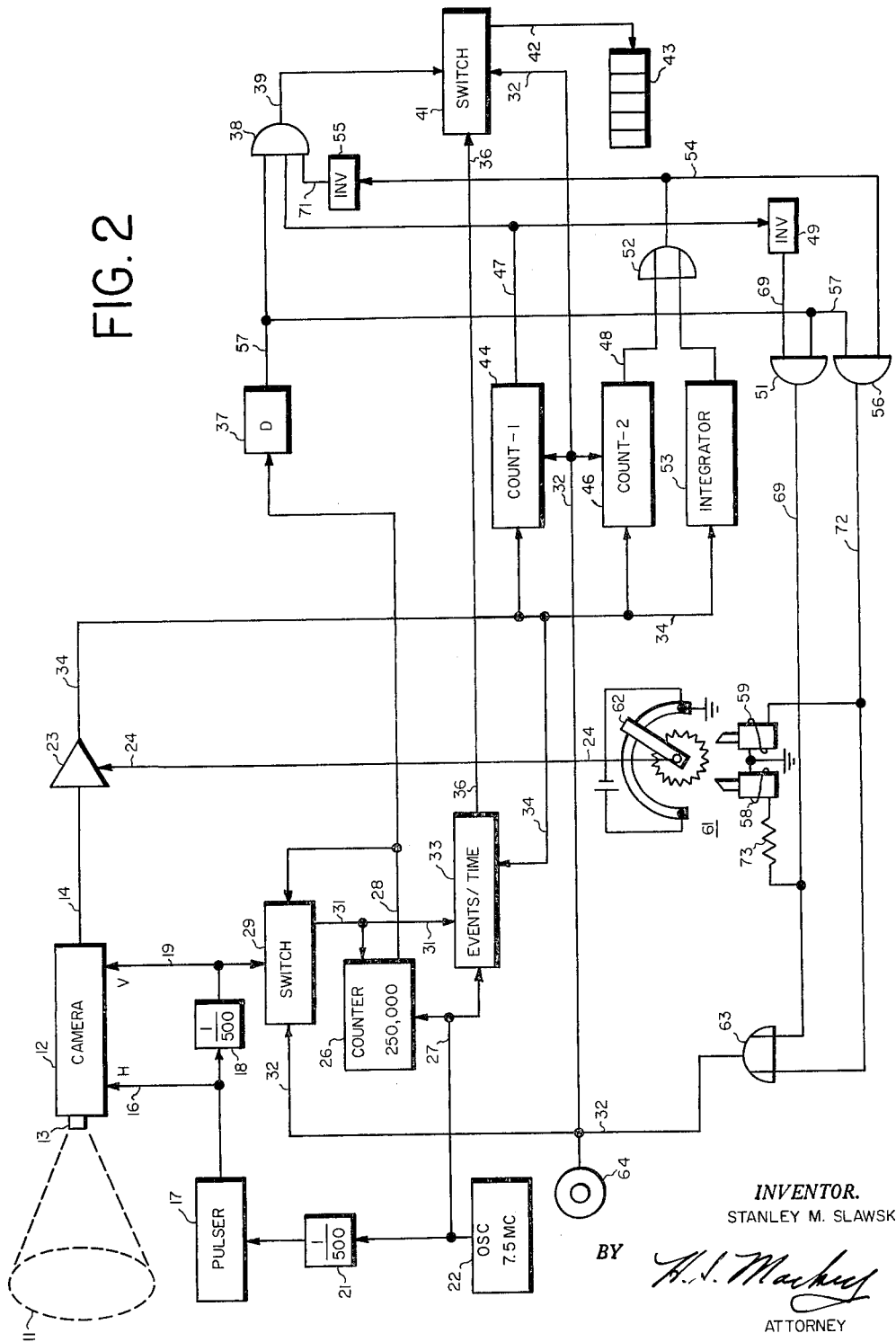

3,209,256
PEAK SIGNAL DETECTOR HAVING AUTOMATIC MEANS TO INDICATE THE MAXIMUM AMPLITUDE AND ITS TIME OF OCCURRENCE
Stanley M. Slawsky, Yorktown Heights, N.Y., assignor to General Precision, Inc., a corporation of Delaware
Filed Sept. 25, 1962, Ser. No. 226,044
5 Claims. (Cl. 324—103)

This invention relates to electronic instruments for detecting the maximum amplitude of an electrical signal and for measuring and indicating its time of occurrence.

In comparing two varying electrical signals which are similar but not identical the cross-correlation method produces an output which, when plotted in terms of increments of comparison positions against amplitude, ideally constitutes a graph having a single, easily observed peak. Similarly, in comparing two areas or two 2-dimensional patterns of any other kind, by the cross-correlation method a three-dimensional graph is secured which ideally has a single maximum of one of the coordinate magnitudes. For example, when the indicated three-dimensional output is in a visual form consisting of light projected to a plane, the third dimension is light intensity. Ideally, the light will have an easily-found maximum intensity at a single point in the plane.

In practice, however, in both the two-dimensional and three-dimensional graphic representations, the single maximum is more or less masked by the existence of other peaks which have nearly the same magnitude.

The present invention provides a method for automatically finding and measuring the location of a maximum peak in a two-dimensional signal. The two dimensions of the signal, when prepared for use by the present instrument, are signal amplitude and time.

The present invention also provides an arrangement for converting a three-dimensional representation of a signal representing an area correlation process to a two-dimensional representation. The invention does this by, in effect, scanning the three-dimensional representation in successive parallel scans to form an electrical signal with time-varied amplitude. This electrical signal is electrically inspected to find peaks, and the highest peak is ascertained. The time coordinate of this peak, representing a point in the original area representation, is now found and displayed on a dial.

An object of this invention is to find and measure the location of a single maximum.

Another object of this invention is to ascertain the existence of a peak in a signal representing a correlation function and to measure its position.

Still another object of this invention is to find and measure the location of a three-dimensional signal maximum.

Other objects and features of the invention will appear from the following description and associated drawings, in which:

FIGURE 2 is a schematic diagram of an embodiment of the invention.

Figure 1:
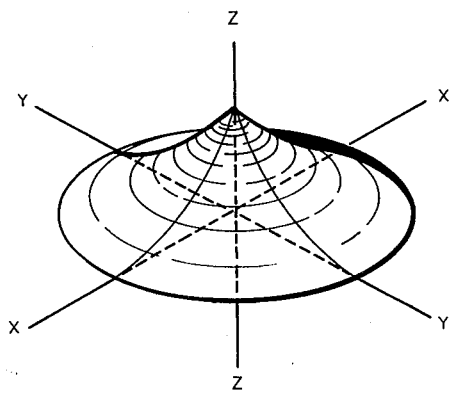
FIGURE 1 is an isometric representation of a three-dimensional graph representing a correlation function.

Referring now to FIGURE 1, a three-dimensional, solid graphic representation of a correlation function is shown. Such a correlation function can be produced, for example, by comparing two photographic patterns which are similar but not identical and, by any correlation process, the means of which are outside of the scope of the present invention, producing the correlation function. The visual form of FIGURE 1 can be generated, for example, by illumination of a plane, XY, in varying degrees of intensity. In FIGURE 1 the coordinates X and Y represent an XY plane and the Z coordinates represent varying degrees of illumination intensity.

The visual form of FIGURE 1 is indicated in FIGURE 2 by the ellipse 11, which represents a three-dimensioned signal having the planar coordinates X and Y and the illumination intensity coordinate Z.

In order to convert this three-dimensional signal into a two-dimensional signal a television camera 12 is employed. Its optical lens 13 converts the subject light image 11 into a similar image projected onto the light-sensitive surface contained within the camera. This surface is scanned, horizontally and vertically, by a cathode ray beam and the output in conductor 14 is an electrical signal having a time-varied intensity representing the beam signal secured from the scanned light-sensitive surface. Thus a two-dimensioned electrical signal is secured in conductor 14 representing the three-dimensioned optical signal 11.

The scanning system chosen employs a raster of 500 non-interlaced horizontal lines forming a picture or field. The speed is such as to permit 30 fields per second. The frequency of the pulser 17 is therefore 15 kc./s. The television camera 12 contains horizontal and vertical scanning circuits. The horizontal circuit is triggered through conductor 16 by pulses applied from the pulser 17 at the horizontal line rate of 15 kc./s. The rate of these pulses is divided by 500 in the scale-of-500 circuit 18 to form a pulse train at 30 c.p.s. This train is applied through conductor 19 to the vertical scanning circuit.

The pulser 17 is excited through a second rate-dividing circuit, or scale-of-500 circuit 21, from a 7.5 mc./s. oscillator 22.

The television camera and its accessory circuits scan the scene 11 continuously at the rate of 500 horizontal lines and one vertical scan per field, and 30 fields per second. Thus each second there is a chronological series of 30 signals applied to the output wire 14. These 30 signals are identical; each consists of a record showing variations in light intensity over the circular area of the object 11 which is scanned.

The camera output conductor 14 applies the camera output signal to a direct-coupled amplifier 23. This amplifier is provided with a sensitivity or threshold control, connected for operation by potential applied from conductor 24, so that it will respond only to signals above a selected amplitude.

A counter 26 is connected through conductor 27 to count the cycles emitted by oscillator 22, and to stop and emit a single pulse on conductor 28 when it has completed a count of 250,000 cycles.

An electronic switch 29 is connected to close the circuit between conductors 19 and 31 when energized by a pulse from conductor 32, and to open the connection between conductors 19 and 31 when energized by a pulse from conductor 28.

An events-per-unit time meter 33 is arranged to be started by a pulse from conductor 31 and to be stopped by a pulse from conductor 34. During its time of operation it counts cycles received through conductor 27 from oscillator 22 and applies a signal representing the number of the count to a group of conductors represented by the line 36. This number may be impressed in any number system, for example in the binary digital system. At the termination of the count, after the counting operation of the meter 33 has been stopped, its terminal count remains as a signal on the group of wires 36. At the time the meter 33 next starts its count the starting pulses erases the number output, resetting it to zero and permitting the new number output to be registered.

The output conductor 28 of the counter 26 is applied through a delay circuit 37, having a delay of a few microseconds, to one input of an AND circuit 38. The AND circuit output is applied through conductor 39 to an input of a switch 41. This switch receives an input from the conductor group 36 and, when its input 39 is energized, the switch is closed and applies the number representation signal received from conductor group 36 to another conductor group 42. This conductor group 42 is terminated at an indicating dial 43 for indicating the number electrically applied to it. The switch 41 is reset or opened by a pulse from conductor 32.

The output conductor 34 of amplifier 23 is connected to a count-1 circuit 44 and a count-2 circuit 46, for the purpose of starting these circuits to count. Each is reset by a pulse received from conductor 32. The count-1 circuit 44 may, for example, consist of a locking electromagnetic relay which is operated by an input from conductor 34, locks itself closed and emits a continuous signal on conductor 47, and is released by a signal received from conductor 32 which releases its locking circuit. The count-2 circuit 46 is similar except that it contains a scale-of-2 circuit to which conductor 34 is connected, so that upon receipt of two pulses it locks itself closed on the second pulse and emits a continuous signal on conductor 48 until released by a pulse applied from conductor 32. The count-1 output conductor 47 is applied to a second input of AND circuit 38 and, through an inverter 49, to an input of an AND circuit 51. The count-2 output conductor 48 is connected to an OR circuit 52.

The conductor 34 is also connected to an integrator 53 having a time period of, say, 5µs. The output of the integrator is connected to the second input of the OR circuit 52. The output conductor 54 of the OR circuit is connected to one input of an AND circuit 56. Second inputs to the AND circuits 51 and 56 are secured through conductor 57 from the output of delay circuit 37. The output of OR circuit 52 is also connected through an inverter circuit 55 to an input of the AND circuit 38.

The outputs of AND circuits 51 and 56 are applied to the two solenoids 58 and 59 of a potentiometer 61 having its output conductor 24 connected to control the amplifier 23. This potentiometer output is increased or reduced in potential as the input solenoid 59 or 58 is energized, respectively ratchetting the arm 62 in one direction or the other.

The outputs of AND circuits 51 and 56 are also applied to the two inputs of an OR circuit 63 the output of which is impressed on conductor 32. A manual start switch 64 also is provided to apply a pulse manually to the conductor 32.

Figure 3:
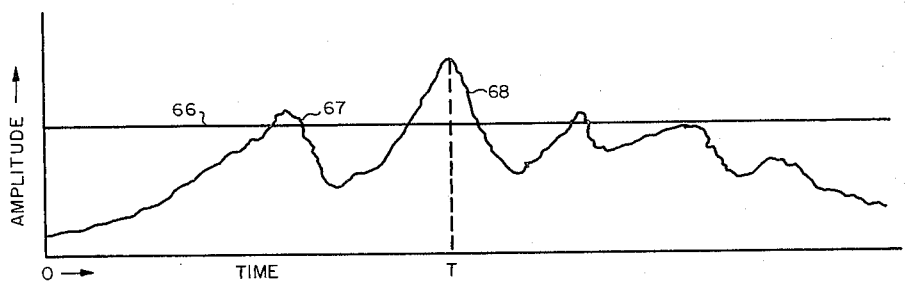
FIGURE 3 is a graph representing the amplitude-varied electrical signal resulting from scanning an area illuminated in accordance with a correlation function.

In the operation of the circuit of FIGURE 2, a two-dimensional visual signal area 11 is observed by the camera 12, which senses the variations in the light intensity of the area. The area 11 is consecutively scanned by a raster of 500 parallel horizontal lines which constitute a single field and a single vertical scan, and the resulting signal appears as a modulated potential on the conductor 14. In general this signal will contain many small irregularities and one or more peaks. Perhaps the highest peak will be partly masked and hard to pick out because of the presence of one or more other peaks, nearly as high. A graph indicating such a signal is shown in FIGURE 3. The line 66 represents the sensitivity threshold to which the amplifier 23 is set. Below this threshold the amplifier output is zero and above this threshold the amount that the graph 67 projects above the line represents the amplitude of the amplifier output.

Four possible cases are distinguished by this system, classified in accordance with the threshold level relative to the graph. When the threshold is at or near the zero amplitude level, the amplifier is at maximum sensitivity and the signal in conductor 34 is likely to be continuous, or nearly so. When the threshold is set as shown in FIGURE 3, three peaks rise above it, a multiple-peak or pulse output is produced. When the threshold rises until only the single, highest peak 68 is above it, the situation constitutes the single-peak case. The fourth case is the situation when the threshold line is above the highest peak and there is no signal at all in conductor 34.

When this zero-signal situation exists, operation is as follows. The oscillator 22 is in operation, switch 29 is open, and counter 26 and meter 33 have been reset and are quiescent. Operation of the start switch 64 initiates action, closing switch 29, so that the next vertical scan pulse from conductor 19 passes through the switch 29 and resets and starts the counter 26 and the events-per-unit time meter 33. The manual start operation also resets the count-1 circuit 44 and the count-2 circuit 46. The meter 33 commences to count the cycles of oscillator 22, impressing successive signals representing the count on the conductor group 36. The counter 26 starts to count, and since no signal appears on conductor 34, the meter 33 is not stopped and the circuits 44 and 46 are not operated. The integrator 53 has no input and no output. At the end of 250,000 cycles of the oscillator 22 the counter 26 stops and emits a pulse on conductor 28. This pulse opens switch 29. It is also, after a delay of a few microseconds by the delay circuit 37, impressed on the conductor 57 input of AND circuit 38. However, since the count-1 circuit 44 has no output, the AND circuit 38 cannot have an output and the switch 41 remains open, so that the number signal on the conductor group 36 cannot be transmitted to the dial 43. The zero output of count-1 circuit 44 is inverted by the inverting circuit 49 to a continuous signal applied to the AND circuit 51. Accordingly, when the pulse output from the delay circuit 37 appears on conductor 57 this pulse passes through the AND circuit 51 and OR circuit 63 to conductor 32. This pulse from AND circuit 51 in conductor 69 also operates ratchet solenoid 58 of the automatic potentiometer 61, reducing the threshold potential applied to the amplifier 23. Thus, for the next operation the threshold line 66, FIGURE 3, is moved to a lower level. The pulse in conductor 32 recloses switch 29 so that, on the occurrence of the next vertical pulse in conductor 19, the whole operation is repeated. The same starting pulse in conductor 32 also resets circuits 44 and 46.

Thus, at every other vertical scan another operation occurs, with the threshold level lowered each time, until the threshold encounters the highest peak of the graph of FIGURE 3. Operation next occurs as the single-peak case.

In the single-peak case, closing of switch 29 permits the counter 26 and meter 33 to start at the next vertical synchronization pulse from conductor 19. When as in FIGURE 3, the maximum peak 68 is encountered, the resulting signal from amplifier 23 impressed on conductor 34 stops the meter 33 and the signal representing the attained number of cycles counted remains on the conductor group 36. Also the signal in conductor 34 operates the count-1 circuit 44 which emits a continuous signal on conductor 47, applying the signal to an input of AND circuit 38. The count-2 circuit 46, has a zero output and this output is inverted by the inverter circuit 55 to a continuous signal which is applied to the AND circuit 38. When the counter has finished its 250,000th count, it emits a pulse on conductor 28 which, after a delay of a few microseconds, is applied to AND circuit 38, producing an output in conductor 39. This causes switch 41 to become conductive, so that the number signal on the conductor group 36 is applied to the conductor group 42 and to the dial 43, which indicates the number represented by the signal. This number represents that one of the 500 horizontal lines, and that one of the 500 elements of that line, representing the point in the area 11 of occurrence of the maximum brightness. This point corresponds, in the signal of FIGURE 3, to the maximum peak 68.

The count-1 circuit 44 output is inverted by circuit 49 to zero output applied to AND circuit 51, which therefore is prevented from operating. As zero signals are emitted from the count-2 circuit 46 and the integrator 53, the AND circuit 56 also is prevented from operating.

In the case shown by FIGURE 3 with the threshold level as indicated by the line 66 so that two or more signal peaks cause two or more discrete output signals from the amplifier 23 on conductor 34, operation is as follows.

As before, the count-1 circuit 44 is operated and locked, causing zero input on conductor 69 input to AND circuit 51, preventing its operation. However, before completion by counter 26 of its 250,000th count, the count-2 circuit 46 is operated and locked closed, causing a continuous signal on its output conductor 48. This is inverted in the inverter circuit 55, causing zero output on conductor 71 and preventing operation of AND circuit 38 and preventing closing of switch 41. Also operation of the count-2 circuit 46 applies through conductor 54 a continuous signal to the AND circuit 56. Therefore, at the termination of the 250,000 count by the counter 26 a pulse applied by it through conductor 57 to AND circuit 56 is transmitted to the ratchet solenoid 59, operating potentiometer 61 to apply a bias to the amplifier 23 raising the threshold level as represented by the line 66, FIGURE 3. The signal in conductor 72 also acts, through conductor 32, to reset the several components and to initiate another operation.

In the fourth case, in which the amplifier 23 is at or near maximum sensitivity and the signal in conductor 34 is either continuous or nearly so, the count-1 circuit 44 operates, preventing AND circuit 51 from operating. Also, the continuous signal on conductor 34 applied to the integrator 53 produces an output of sufficient strength to apply a signal, through conductor 54, to the AND circuit 56. The same signal prevents AND circuit 38 from operating. At the end of the 250,000 count of counter 26 the AND circuit 56 operates, causing the potentiometer 61 to raise the threshold level and, through conductor 32, resetting components and starting another operating cycle.

In the unlikely event that the count-1 circuit 44 does not operate, the operation is the same except that, in addition, the AND circuit 51 operates, tending to cause operation of the ratchetting solenoid 58. However, due to the presence of a resistor 73, when both solenoids 58 and 59 are energized the latter overrides the former, and the threshold level is raised.

What is claimed is:

1. A signal maximum detector comprising,
   an amplifier having a signal of varying amplitude impressed thereon, said amplifier including threshold control means for adjusting the amplifier signal acceptance level so that only those input signal level magnitudes which exceed said acceptance level are represented in said amplifier output,
   means for sampling the output of said amplifier over a selected time period,
   means operated by the output of said amplifier for adjusting said threshold control means in a direction dependent on the characteristic of said amplifier output, and
   means for indicating the time of occurrence of an amplifier output signal only when the output characteristic consists of a single signal of short duration occurring during said selected time period.

2. A signal maximum detector comprising,
   an amplifier having a signal of varying amplitude impressed thereon, said amplifier including threshold control means for adjusting the amplifier signal acceptance level so that only those input signal magnitudes which exceed said acceptance level are represented in said amplifier output,
   means for sampling the output of said amplifier over selected successive time periods,
   means operated in the absence of any output from said amplifier during a selected time period for adjusting said threshold control means in a direction to reduce said signal acceptance level,
   means operated by a plurality of amplifier output signals occurring during a single selected time period for adjusting said threshold control means in a direction to increase said signal acceptance level,
   means opearted by an amplifier output signal occupying a preselected portion of a selected time period for adjusting said threshold control means in a direction to increase said signal acceptance level, and
   means for indicating the time of occurrence of an amplifier output signal only when the output signal characteristic of said amplifier consists of a single signal of short duration occurring during a selected one of said successive time periods.

3. A signal maximum detector comprising,
   an amplifier having a signal of varying amplitude impressed thereon, said amplifier including threshold control means for adjusting the amplifier signal acceptance level so that only those input signal level magnitudes which exceed said acceptance level are represented by signals in said amplifier output,
   a signal generator generating a cyclically varying signal,
   a counter having the output of said signal generator imposed thereon for counting a selected number of the cyclic variations of said generator output signal and producing a termination signal at the end of such count,
   an events-per-unit time meter having the output of said signal generator imposed thereon and counting the cyclic variations of said generator output signal,
   means for simultaneously initiating operation of said counter and said events-per-unit time meter,
   means operated at the inception of an output signal of said amplifier for terminating the counting operation of said events-per-unit time meter,
   means automatically adjusting the threshold control means to vary said amplifier acceptance level in a direction dependent on the characteristic of the amplifier output, and
   means for displaying the count attained by said events-per-unit time meter when and only when the output characteristic of said amplifier consists of a single signal of short duration occurring during the period of operation of said counter in counting said selected number of cyclic variations.

4. A signal maximum detector comprising,
   an amplifier having a signal of varying amplitude impressed thereon, said amplifier including threshold control means for adjusting the amplifier signal acceptance level so that only those input signal level magnitudes which exceed said acceptance level are represented by signals in said amplifier output,
   a signal generator generating a cyclically varying signal,
   a counter having the output of said signal generator imposed thereon for counting a selected number of the cyclic variations of said generator output signal and producing a termination signal at the end of such count,
   an events-per-unit time meter having the output of said signal generator imposed thereon and counting the cyclic variations of said generator output signal,
   means for simultaneously initiating operation of said counter and said events-per-unit time meter,
   means operated at the inception of an output signal of said amplifier for terminating the counting operation of said events-per-unit time meter, means operated in the absence of any output from said amplifier during the period of operation of said counter in counting said selected number of cyclic variations for adjusting said threshold control means in a direction to reduce the signal acceptance level of said amplifier, means operated by a plurality of amplifier output signals occurring during the period of operation of said counter in counting said selected number of cyclic variations for adjusting said threshold control means in a direction to increase the signal acceptance level of said amplifier, means operated by an amplifier output signal occupying a preselected portion of the period of operation of said counter in counting said selected number of cyclic variations for adjusting said threshold control means in a direction to increase the acceptance level of said amplifier, and means for displaying the count attained by said events-per-unit time meter when and only when the output characteristic of said amplifier consists of a single signal of short duration occurring during the period of operation of said counter in counting said selected number of cyclic variations.

5. A signal maximum detector comprising, an amplifier having a signal of varying amplitude impressed thereon, said amplifier including threshold control means for adjusting the amplifier signal acceptance level so that only those input signal level magnitudes which exceed said acceptance level are represented by signals in said amplifier output, a signal generator generating a cyclically varying signal, a counter having the output of said signal generator imposed thereon for counting a selected number of the cyclic variations of said generator output signal and producing a termination signal at the end of such count, an events-per-unit time meter having the output of said signal generator imposed thereon and counting the cyclic variations of said generator output signal, means for simultaneously initiating operation of said counter and said events-per-unit time meter, a count-1 circuit for producing an output on the occurrence of a single pulse applied to its input, a count-2 circuit for producing an output on the occurrence of two pulses applied to its input, an integrator having a selected time period for producing an output when the time duration of a signal applied to its input exceeds said selected time period, said count-1 circuit, said count-2 circuit and said integrator each having their inputs connected to the output of said amplifier, means operated in the absence of outputs from any of said count-1, count-2 and integrator circuits during the period of operation of said counter in counting said selected number of cyclic variations for adjusting said threshold control means in a direction to reduce the signal acceptance level of said amplifier, means operated by an output signal produced by said count-2 circuit during the period of operation of said counter in counting said selected number of cyclic variations for adjusting said threshold control means in a direction to increase the signal level of said amplifier, means operated by an output signal produced by said integrator during the period of operation of said counter in counting said selected number of cyclic variations for adjusting said threshold control means in a direction to increase the acceptance level of said amplifier, and means for displaying the count attained by said events-per-unit time meter on the sole occurrence of an output signal on the output of said count-1 circuit and the absence of output signals on the outputs of said count-2 and integrator circuits.

References Cited by the Examiner

UNITED STATES PATENTS 2,779,869   1/57   Gerks _____ 324—77 X

WALTER L. CARLSON, *Primary Examiner.*

RUDOLPH V. ROLINEC, *Examiner.*